Patented Sept. 2, 1952

2,609,297

UNITED STATES PATENT OFFICE 2,609,297

PROCESS OF PROTECTING FATTY AND PHOSPHOROUS LIPOIDIC FOOD PRODUCTS, PARTICULARLY MILK AND DAIRY PRODUCTS, MARGARINE AND THE LIKE, AGAINST GETTING UNPLEASANT TASTE OR FLAVOR

Charles Gunnar Ebbe Sjöström, Alnarp, Åkarp, and Åke Valdemar Larsson, Linköping, Sweden No Drawing. Application September 12, 1949, Serial No. 115,316. In Sweden September 11, 1948

9 Claims. (Cl. 99—57)

This invention relates to a process of protecting fatty and phosphorous lipoidic food products, particularly milk and dairy products, margarine and the like, against getting unpleasant taste or flavour, e. g. tin taste, metal taste, "oily" flavour (for instance, when butter is concerned). The process comprises admixing small amounts of a protective agent manufactured in a special manner, to the article to be protected, preferably during its preparation or manufacture. The manufacture of this protective agent is the first step of the process and will therefore be described first.

As starting material for the manufacture of the protective agent there is used unskimmed or skimmed milk, whey, milk or whey powder mixed with water, or a solution of lactose, grape-sugar, galactose, xylose or fructose, or two or more of these sugars. The starting material is admixed with alkali to pH 8 or more and is heated for some time preferably to at least 80° C. without air being admitted, during which heating the pH of the solution sinks, whereupon the same treatment is repeated one or more times by new addition of alkali and continued heating without air being admitted. The repeated increase of pH by new addition of alkali after pH has sunk during the heating without admission of air, has proved to be of essential practical importance for accomplishing the process. The period of time, during which the heating without admission of air should continue after each addition of alkali, varies with the starting material used and with the temperature, to which the heating is effected; the higher the temperature, the shorter the time required. Finally, the pH of the material treated in the manner described by repeated addition of alkali and heating without admission of air, is adjusted preferably by means of hydrochloric acid to about 6.8, whereupon cooling in water to room temperature is effected. The obtained preparation may be utilized as a protective agent addition to milk, dairy products, margarine and other fatty and phosphorous lipoidic food products either direct, e. g. in the form of a solution, or in the form of a powder, prepared from the solution by evaporation in vacuum or by spray-drying preferably in an indifferent gas. When in form of powder the preparation has a very good durability, and also when in form of a solution the preparation will keep a rather long time, when stored without air being admitted.

Preparations prepared in the above manner from starting materials containing both albumin and sugar seem superior to those prepared from pure sugar solutions. Of the starting materials mentioned whey seems the most appropriate. Thus the preparations prepared from whey seem superior to those prepared from pure sugar solutions inter alia as far as taste and flavour are concerned.

When preparing the preparation care should be taken to avoid, as far as possible, caramelization of the material or to keep the caramelization, if any, at as low a rate as possible in order that the preparation prepared may not impart any taste or flavour to the product to which it is admixed as a protective agent against unpleasant taste or flavour.

The following is an example of how the protective agent is prepared.

15 parts of volume of whey together with some solid paraffin or paraffin oil are placed in a vessel and heated to, and maintained at, a temperature of 90 to 95° C. 1 part of volume of 1 n.NaOH is added, whereby pH is carried up to about 11.5. The paraffin covers the surface of the contents of the vessel and prevents admission of air. After 6 to 7 minutes pH has sunk to about 9, whereupon 1 part of volume of 1 n.NaOH is again added. When, after about 5 minutes, pH has sunk again to 9, another 0.5 part of volume of 1 n.NaOH is introduced. When the pH of the solution has sunk to 8.8 to 9.0, 0.3 part of volume of 1 n.HCl is added, whereby the pH of the solution is carried down to 6.8.

The addition of the preparation to the article to be protected against getting unpleasant taste or flavour is best effected at some preliminary stage of the preparation or manufacture of the article. It may be mentioned as an example that in the production of dried milk the preparation may suitably be admixed with the milk before the evaporation thereof. It may be mentioned as a second example that in the manufacture of butter the preparation may suitably be added to the cream either at its acidification or immediately before churning. As a third example it may be mentioned that in the production of margarine the preparation may suitably be admixed into the aqueous phase (the acidified skimmed milk) at the same time as fat and other additions are admixed. An example of the amounts, in which the preparation must be added is that an addition of 2 to 10 parts of weight of a preparation in powder form prepared from whey, or of the corresponding amount of the preparation in the form of an aqueous solution to 10,000 parts of weight of a 30% cream in the production of butter therefrom has had a rather long time under not very favourable conditions the butter kept at or above the Rune Brand limit, whereas control tests of butter without any addition of protective agent were far below said limit. The protective agent added to the cream in the production of butter therefrom protected also the butter milk obtained from getting the unpleasant taste (tin taste) otherwise occurring.

Although the most important of the starting material that may be used for the manufacture of the protective preparation will be those enumerated above, it is obvious that the invention is not limited to the use of these materials but also comprises the use of other similar starting materials for the manufacture of the protective preparation.

What we claim and desire to secure by Letters Patent is:

1. A process of protecting milk, butter, margarine and other edible dairy products against acquiring an unpleasant flavor, comprising incorporating with the dairy product to be protected a relatively small amount of a protective agent, said protective agent prior to the incorporation thereof with the dairy product to be protected formed from a starting material comprising an aqueous solution of a reducing sugar, subjecting said starting material, with the exclusion of air, at a temperature in the range of from about 80° C. to about 95° C., to a treatment with alkali added to said starting material first in an amount to raise the pH thereof to at least about 9, and not materially above 11.5, and then successively adding further amounts of alkali to repeatedly raise the pH of the material after it has fallen, said treatment of the material with alkali at a pH of at least about 9 thus being prolonged for a sufficient period to impart the protective properties to said treated material which constitutes the protective agent.

2. A process as claimed in claim 1, in which the starting material from which said protective agent is formed, is selected from the group of materials consisting of unskimmed milk, skimmed milk, whey, milk powder mixed with water and whey powder admixed with water.

3. A process as claimed in claim 1, in which the pH of said treated material prior to the incorporation thereof with the substance to be protected is adjusted to about 6.8.

4. A process as claimed in claim 1, in which said treated material obtained in the form of a solution is added in such form to the substance to be protected.

5. A process as claimed in claim 1, in which said treated material obtained in the form of a solution is converted by drying under conditions substantially prohibitive to oxidation of the material, into powder form and is added in such form to the substance to be protected.

6. A process as claimed in claim 1, in which the reducing sugar in the starting material from which the protective agent is formed, is selected from the group of reducing sugars consisting of lactose, grape sugar, galactose, xylose and fructose.

7. A process as claimed in claim 2, in which the starting material from which the protective agent is formed, is whey.

8. A protective agent adapted to be added to milk, butter, margarine and other edible dairy products to prevent said dairy products from acquiring an unpleasant flavor comprising whey subjected to a temperature in the range of from about 80° C. to about 95° C., in the absence of air, and treated with alkali to a pH of at least about 9 and not above 11.5, said alkali being added in successive amounts for a prolonged period of time with the exclusion of air in order to maintain the pH to at least about 9 and not more than 11.5.

9. A protective agent added in a small amount to milk, butter, margarine and other edible dairy products to prevent said dairy products from acquiring an unpleasant flavor, said protective agent comprising whey subjected to a temperature in the range of from about 80° C. to about 95° C., in the absence of air, and treated with alkali to a pH of at least about 9 and not above 11.5, said alkali being added in successive amounts for a prolonged period of time with the exclusion of air in order to maintain the pH to at least about 9 and not more than 11.5.

CHARLES GUNNAR EBBE SJÖSTRÖM.
ÅKE VALDEMAR LARSSON.

REFERENCES CITED

The following references are of record in the file of this patent:

UNITED STATES PATENTS

| Number | Name | Date |
| --- | --- | --- |
| 735,148 | Ramage | Aug. 4, 1903 |
| 1,041,896 | Stillwell | Oct. 22, 1912 |
| 1,443,528 | Dunham | Jan. 30, 1923 |
| 1,600,573 | Bell | Sept. 21, 1926 |
| 2,023,359 | Sirek | Dec. 3, 1935 |
| 2,123,203 | Riggs et al. | July 12, 1938 |
| 2,123,218 | Wanshenk | July 12, 1938 |
| 2,349,969 | Kremers | May 30, 1944 |